(12) United States Patent
Ball et al.

(10) Patent No.: US 10,692,295 B1
(45) Date of Patent: *Jun. 23, 2020

(54) VISUALIZATION OF CONNECTIVITY AMELIORATION WITHIN AUGMENTED REALITY AND OTHER USER INTERFACE ENVIRONMENTS

(71) Applicant: International Business Machines Corporation, Armonk, NY (US)

(72) Inventors: Blake Ball, Austin, TX (US); Narine Cholakyan, Austin, TX (US); Jeremy R. Fox, Georgetown, TX (US); Trisha Moyer, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/525,756

(22) Filed: Jul. 30, 2019

Related U.S. Application Data (63) Continuation of application No. 16/247,853, filed on Jan. 15, 2019.

(51) Int. Cl.
*G06T 19/00* (2011.01)
*G02B 27/01* (2006.01)
(Continued)

(52) U.S. Cl.
CPC ........ *G06T 19/006* (2013.01); *G02B 27/0172* (2013.01); *G06F 3/0304* (2013.01); *H04W 4/80* (2018.02)

(58) Field of Classification Search
CPC . G06T 19/006; G06F 3/0304; G02B 27/0172; H04W 4/80
See application file for complete search history.

(56) References Cited

U.S. PATENT DOCUMENTS 9,547,939 B2   1/2017  Hittel et al.
2010/0110932 A1  5/2010  Doran et al.
(Continued)

FOREIGN PATENT DOCUMENTS

WO   WO 2017/143239 A1   8/2017

OTHER PUBLICATIONS

Sra et al., Procedurally Generated Virtual Reality from 3D Reconstructed Physical Space, Nov. 2016, ACM, 191-200 (Year: 2016).*

*Primary Examiner* — Robert J Craddock
(74) *Attorney, Agent, or Firm* — Gregory Goshorn; Alexander G. Jochym (57) ABSTRACT

Provided are techniques for the establishing device connectivity via a virtual based pictorial or graphical format. A users is presented with visual connection options to various devices so that the user can determine what devices are available and to select and customize options for selected devices. With the presentation of dynamic live streaming device connectivity visualizations via augmented reality, a user can make educated and real time decisions concerning potential connection. The provided device connectivity visualization is applicable to currently available devices such as, but not limited to, augmented reality (AR) in glasses and any portable device such as a smart telephone or tablet computing device. Device connectivity is mapped and displayed on a user's device. The use is then able to connect to a remote device using voice commands or by selecting the remote device on the portable device. The claimed subject matter supports simultaneous connectivity of multiple devices.

7 Claims, 6 Drawing Sheets

(51) Int. Cl.
*G06F 3/03* (2006.01)
*H04W 4/80* (2018.01)

(56) References Cited

U.S. PATENT DOCUMENTS

2017/0243400 A1* 8/2017 Skidmore .......... G02B 27/0172
2018/0083848 A1 3/2018 Siddiqi et al.

* cited by examiner

VISUALIZATION OF CONNECTIVITY AMELIORATION WITHIN AUGMENTED REALITY AND OTHER USER INTERFACE ENVIRONMENTS

CROSS-REFERENCES TO RELATED APPLICATIONS

The present application is a continuation and claims the benefit of the filing date of an application entitled, "Visualization of Connectivity Amelioration Within Augmented Reality and Other User Interface Environments" Ser. No. 16/247,853, filed Jan. 15, 2019, assigned to the assignee of the present application, and herein incorporated by reference.

FIELD OF DISCLOSURE

The claimed subject matter relates generally to wireless connections and, more specifically, to facilitating the setup of wireless connection using augmented reality and other user interfaces.

BACKGROUND OF THE INVENTION

Today, when wireless devices, such as Bluetooth devices, WiFi devices, and Near Field Communication (NFC) devices, or beacons, are paired, or connected with a user device, there is no way to visually establish the device to device connection. Currently, pairing of devices is based upon previous settings established through a traditional screen interface. In other words, no options are available to visualize the action of establishing the connection, thus missing an opportunity to improve connection abilities and characteristics. Existing models require some amount of user interaction via an on-screen user interface to establish an initial pairing of two devices.

SUMMARY

Provided is are techniques for the establishing device connectivity via a virtual based pictorial or graphical format. A users is presented with visual connection options to various devices so that the user can determine what devices are available and to select and customize options for selected devices. With the presentation of dynamic live streaming device connectivity visualizations via augmented reality and other user interfaces, a user can make educated and real time decisions concerning potential connections.

This disclosure focuses on device connectivity visualization using currently available devices such as, but not limited to, augmented reality (AR) in glasses and any portable device such as a smart telephone or tablet computing device. Device connectivity is mapped and the mapping is displayed on a user's device. The user is then able to connect to a remote device using voice commands or by selecting the remote device on the portable device. The claimed subject matter supports simultaneous connectivity of multiple devices.

Provided are methods for controlling wireless devices, comprising scoping a current physical environment to determine a plurality of existing objects within the current environment; detecting a plurality of wireless communication devices present among the plurality of existing objects; establishing a plurality of connections, each connection with a respective wireless communication device of the plurality of wireless communication devices; generating a visual rendering, including representations corresponding to each of the wireless communication devices, of the current environment based upon the scoping and information received during the establishing of the plurality of connections, each representation indicating a status of the corresponding wireless communication device; and controlling one or more of the wireless communication devices based upon the corresponding status. Also provided are apparatuses and computer programming products that implement the method.

In accordance with the claimed subject matter, the functionality and capability of wireless devices, both those connecting and being connected to, is improved by simplifying, clarifying and automating connection options. Additionally, the functionality or capability of wireless devices is improved by preventing users from spending time and utilizing computing resources (e.g., processing resources) attempting to identify and understand the errors that typically occur during wireless device connectivity. By reducing the amount of computing resources being utilized by users from identifying and understanding such errors, computing resources (e.g., processing resource) are more efficiently utilized.

Furthermore, the present invention improves the technology or technical field involving wireless communication. As discussed above, the breaks down the wireless connectivity process into stages, such as scope, display, configure and connect. Each stage is aimed at verifying the quality of new features from a different angle to validate the new functionality and prevent errors from affecting potential connections. The present invention improves such technology by creating a model by integrating technologies such as virtual reality and wireless communication. The technical solution provided by the disclosed technology cannot be performed in the human mind or by a human using a pen and paper. That is, the technical solution provided by the claimed subject matter could not be accomplished in the human mind or by a human using a pen and paper in any reasonable amount of time and with any reasonable expectation of accuracy without the use of a processor.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PEA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
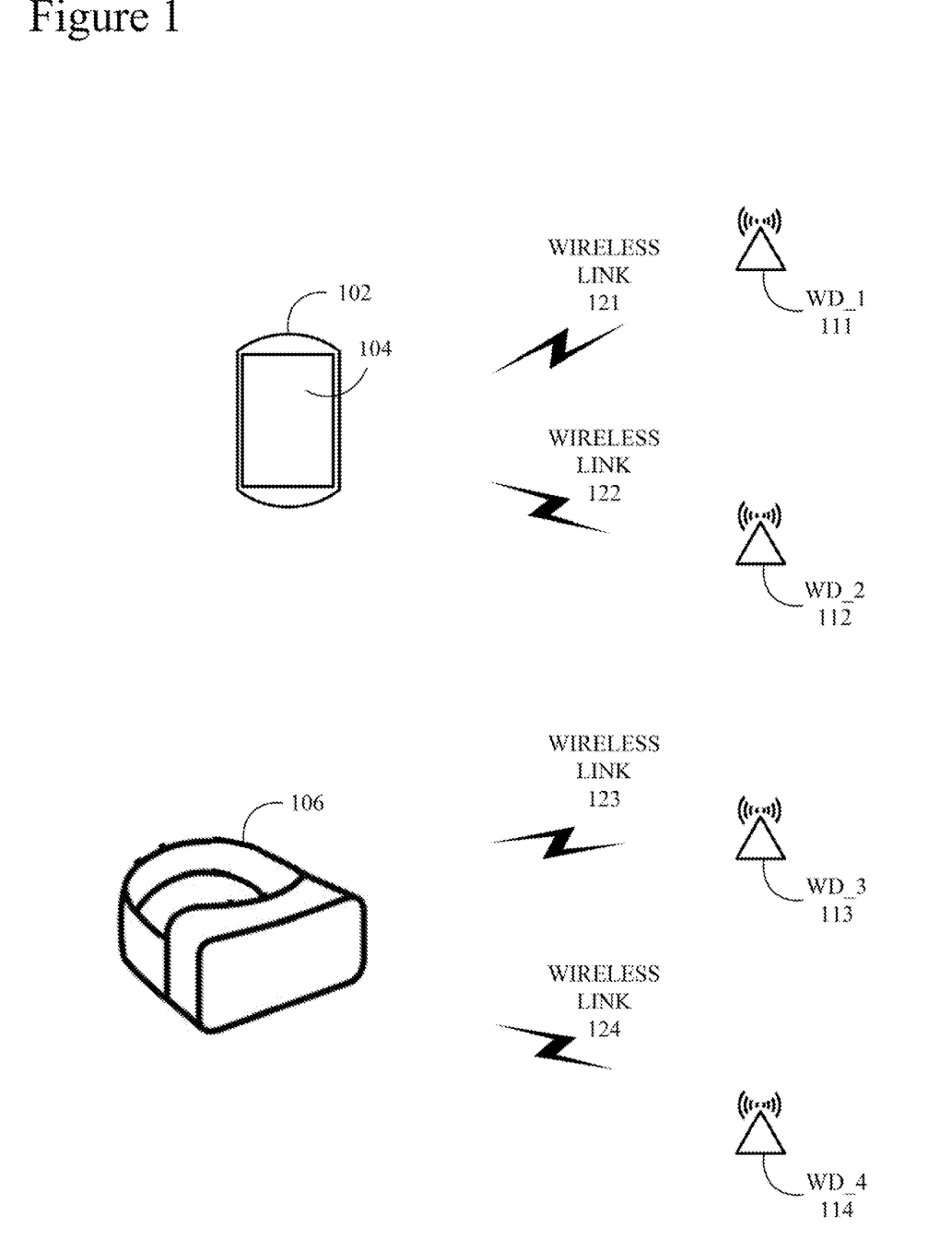
FIG. 1 is a illustration of various devices that may be involved in an implementation of the claimed subject matter.

Turning now to the figures, FIG. 1 is an illustration of various devices that may be involved in an implementation of the claimed subject matter. A mobile telephone, or smartphone, 102, which includes a touch-screen display 104, and virtual reality (VR) goggles 106 are shown. Potential wireless devices with which smartphone 102 and VR goggles 106 might be communicatively coupled include wireless devices that are in proximity to smartphone 102 and VR goggles 106. In this example, smartphone is communicatively coupled to two wireless devices. i.e., a WD_1 111 and a WD_2 112 via connections 121 and 122, respectively. VR goggles 106 is communicatively coupled to a WD_3 113 and a WD_4 114 via connections 123 and 124, respectively. Wireless devices 111-114 and communication links 121-124 may be any available type of connection, including but not limited to, Bluetooth®, Near Field Communication (NFC) and Wi-Fi technologies. Smartphone 102, VR goggles 106 and wireless communication devices 111-114 are used throughout the Specification to describe aspects of the claimed subject matter.

Figure 2:
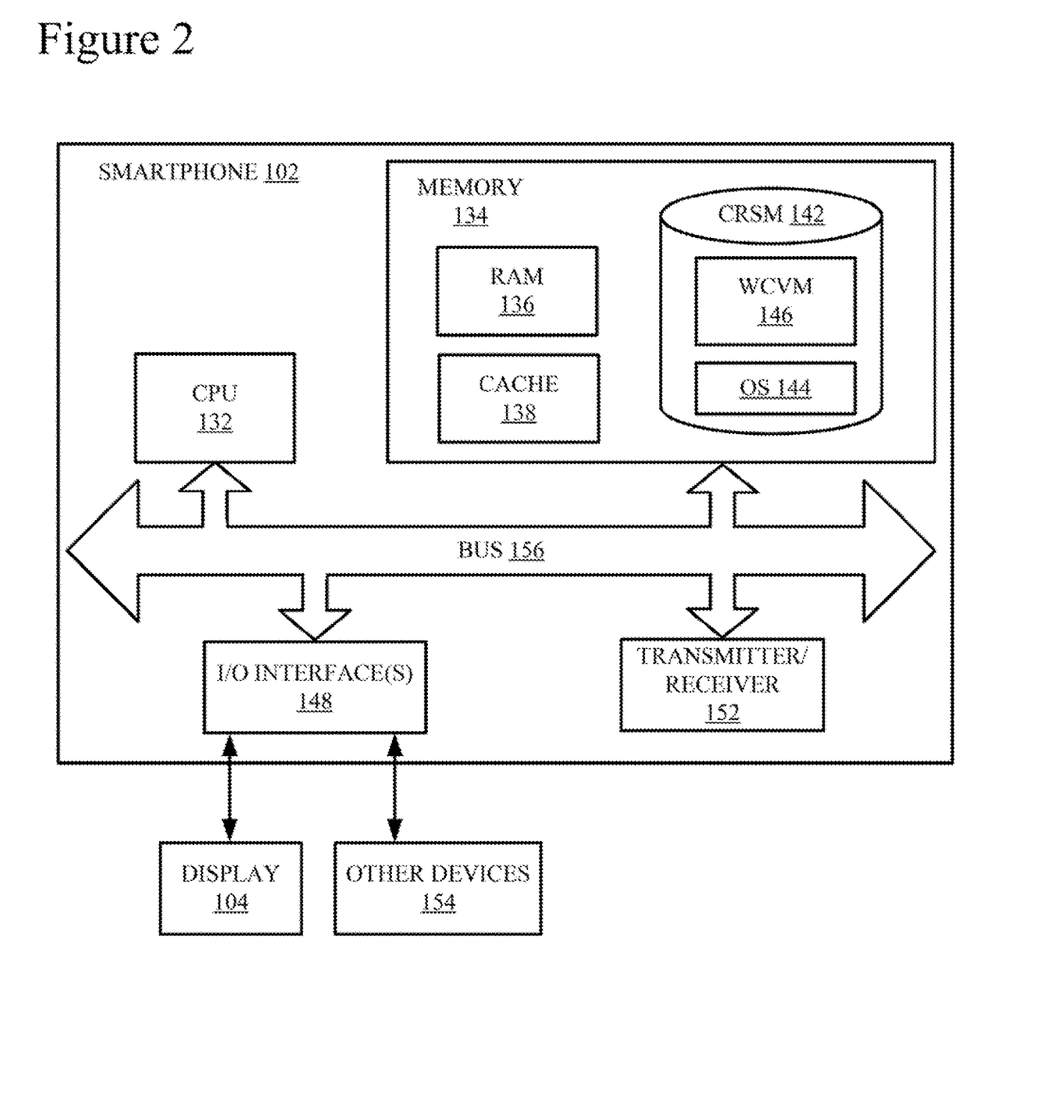
FIG. 2 is a block diagram of a smartphone, first introduced in FIG. 1, that is used as an example of a device on which the claimed subject matter may be implemented.

FIG. 2 is a block diagram of smartphone 102, first introduced in FIG. 1, in greater detail. In this example, components of smartphone 102 include a CPU 132, which would include one or more physical processors (not shown), a memory 134, which includes a random access memory (RAM) 136, a cache memory 138 and a non-transitory, computer-readable storage medium (CRSM) 142. CRSM 142 is illustrated as storing an operating system (OS) 144 and a Wireless Connection Visualization Module (VCVM) 146. WCVM 146 is responsible for implementing aspects of the claimed subject matter and is described in more detail below in conjunction with FIGS. 3-6.

Also included in smartphone 102 are Input/Output (I/O) interfaces(s) 148 and a transmitter/receiver 152. I/O interface(s) 148 enables smartphone 102 to interact with display 104 (FIG. 1) and any other devices 154 that may be attached. Examples of other devices include a microphone (not shown) and camera (not shown). Transmitter/receiver 152 enables smartphone 102 to be communicatively coupled to wireless devices 111-114 (FIG. 1), which may be, but are not limited to, cellular telephone, NFC, WiFi and Bluetooth devices. CPU 132, memory 134, I/O interface(s) 138 and transmitter/receiver 152 communicate with each other within smartphone 102 over a communication bus 156.

It should be understood that FIG. 2 is a simplified illustration of a smartphone or any other device that may implement the claimed subject matter. While various components are described to aid in the following description of the disclosed technology, other components, both optional and necessary for the functionality of smartphone 102 may be omitted for the sake of simplicity. Further, smartphone 102 is only one single example of a device that may be configured in accordance with the claimed subject matter. Those with skill in the relevant arts should appreciate that other types of devices, both actual and yet to be developed, may also benefit from the claimed technology.

Figure 3:
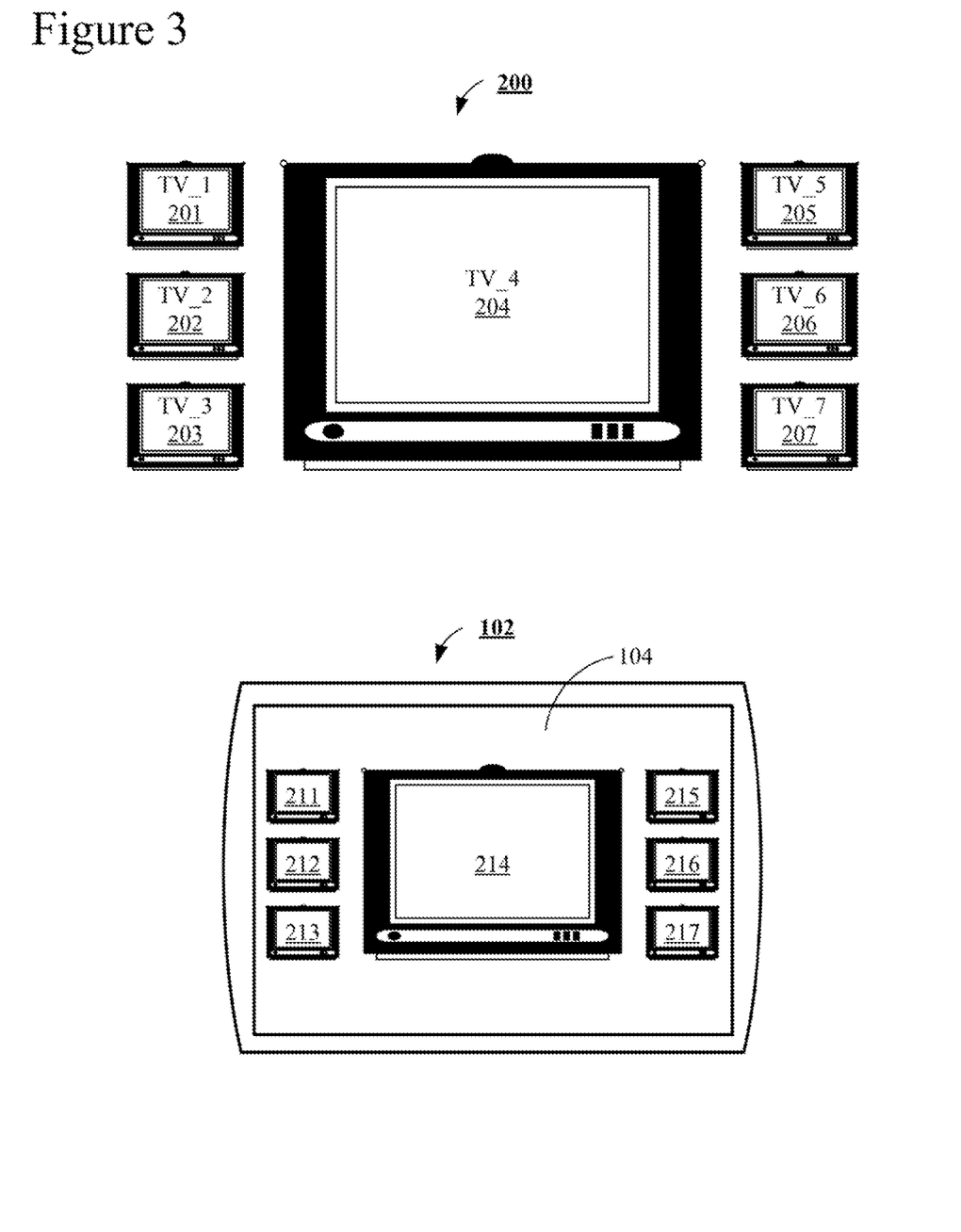
FIG. 3 is an illustration of a number of potential remotes devices with which a user might connect and a user device to which the remote devices might connect.

FIG. 3 is an illustration of a number of potential remotes devices 200 with which a user might connect. Also illustrated is smartphone 102 (FIGS. 1&2) to which any of the remote devices 200 might connect. It should be noted that devices 200 and 102 are not drawn to scale but rather as they might appear to a user (not shown) holding smartphone 102 and viewing a number of television monitors such as remote devices 200 at a distance in a public setting such as a restaurant or tavern. Such a setting, whether public or private, is referred to as a "situation" or "environment."

In this example, remote devices 200 include a number of television monitors, i.e., a TV_1 201, a TV_2 202, a TV_3 203, a TV_4 204, a TV_5 205, a TV_6 206 and a TV_7 207. Monitors 201-207 are merely used to describe the claimed subject matter and are not intended to limit the types and numbers of devices with which connections might be established. Those with skill in the relevant arts will recognize that the disclosed technology has application to a wide variety of devices and situations.

It should be understood that smartphone 102 is only one example of a device on which the claimed subject matter might be implemented. As explained in the Summary, other examples include glasses with an AR capability such as VR goggles 106 (FIG. 1) or any device that would be apparent to one with skill in the relevant arts.

Within display 104 (FIG. 1), a graphical representation of monitors 201-207 is displayed. An icon 211 represents TV_1 201, an icon 212 represents TV_2 202, an icon 213 represents TV_3 203, an icon 214 represents TV_4 204, an icon 215 represents TV_5 205, an icon 216 represents TV_6 206 and an icon 217 represents TV_7 207. Icons 211-217 are described in more detail below in conjunction with FIG. 4-6.

Figure 4:
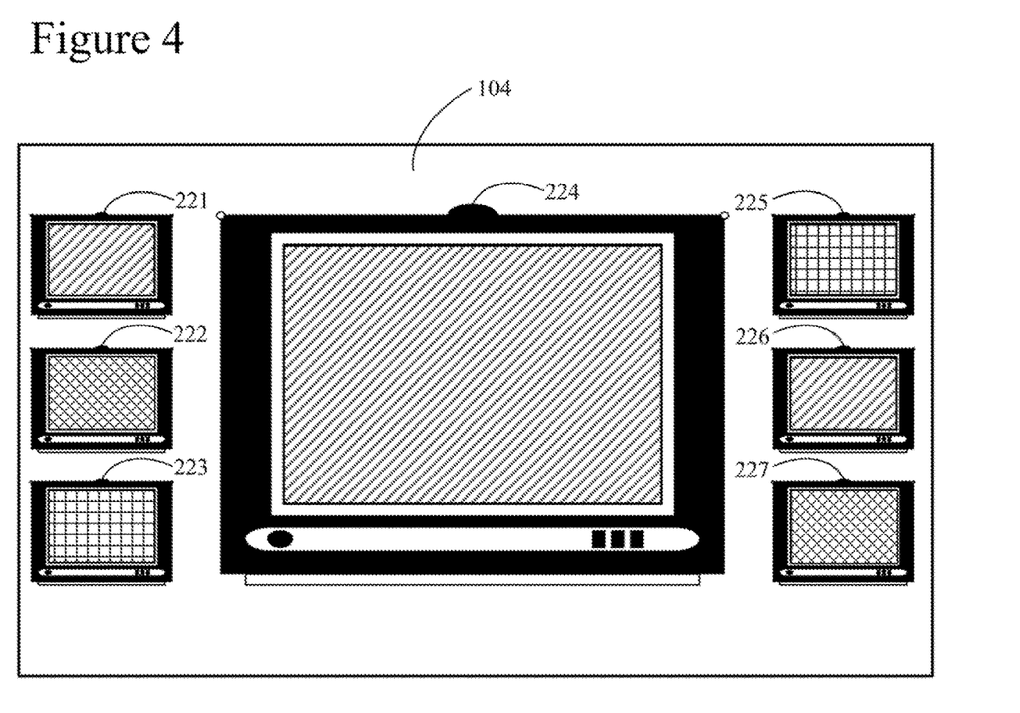
FIG. 4 is an illustration of a display associated with the user device of FIG. 3 in greater detail.

FIG. 4 is an illustration of display 104 associated with smartphone 102, both introduced in FIG. 1, as augmented with additional information. Also shown are icons 221-227. In this example, icons 221-227, which correspond to icons 211-217 (FIG. 3), respectively, are coded with particular patterns to indicate different connectivity status or options. Rather than being coded with patterns, icons 221-227 may be color coded. Like icons 211-217, as explained above in conjunction with FIG. 3, each of icons 221-227 represents a specific device, i.e., monitors 201-207 (FIG. 3), respectively, with which smartphone 102 may be communicatively coupled.

Icon 221 is shaded with a  pattern, i.e., a "slanted line pattern," indicating that smartphone 102 is successfully paired with, or connected to, monitor 201. Icon 222 is shaded with a  pattern, i.e., a "cross-hatched pattern," indicating that smartphone 102 is eligible to be but not yet paired with monitor 202. Icon 223 is shaded with a  pattern, i.e., a "cross-boxed pattern," indicating that smartphone 102 is not eligible to be paired with monitor 203. In a similar fashion, icons 224 and 226 are shaded with slanted line pattern to indicate that smartphone 102 is successfully paired with, or connected to, monitors 204 and 126, respectively; icon 225 is shaded with cross-boxed pattern to indicate that monitor 205 is not eligible to be paired with smartphone 102; and icon 227 is shaded with cross-hatched pattern, indicating that smartphone 102 is eligible to be paired with monitor 207.

A user, using touchscreen 104, may then control connections to devices 201-207 by touching screen 104 at the appropriate icon 221-227 and selecting various connection options (not shown) that might be displayed. Examples of such options include, but are not limited to, connect, disconnect, mute and pause, depending upon the status of the respective device 201-207 as indicated by the displayed patterns. A user of VR goggles 106 (FIG. 1) may use voice commands or other known methods know to those with skill in the relevant arts of interacting with a display rendered by VR goggles 106.

It should be understood that slanted lines, cross-hatch and cross-boxed patterns are merely examples of graphical representations of various status and options of the corresponding remote devices. Many additional patterns and colors may be utilized and many more states and options may be represented in accordance with the claimed subject matter. For example, visual representations such as icons 221-227 may be reflective of types of transfer or traits and characteristics of possible connections including, but not limited to, confidentiality, security of a particular connection, topic, subjects and sentiment. The disclosed technology may also simulate or predict future device connectivity paths based upon historical activity. Further, connectivity paths may be recommended to a user based on convenience or projected interest or need.

Figure 5:
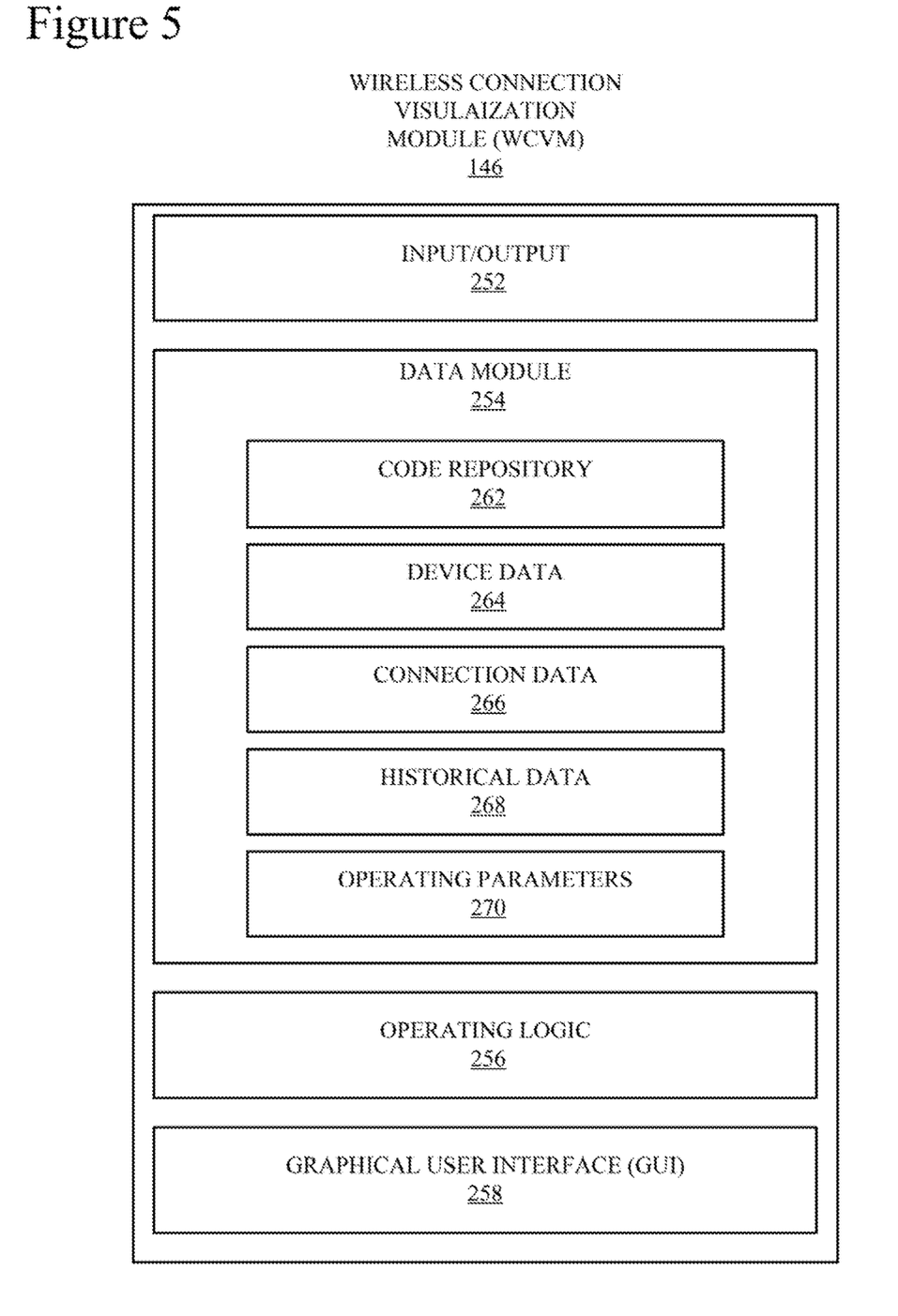
FIG. 5 is an example of a memory object associated with a Wireless Connection Visualization Module (WCVM) introduced in FIG. 2.

FIG. 5 is a block diagram of one example of Wireless Connection Visualization Module (WCVM) 146 introduced in FIG. 2 that may implement the claimed subject matter. WCVM 146 includes an input/output (I/O) module 252, a data module 254, operating logic 256, and a graphical user interface module, or simply "GUI," 258. For the sake of the following examples, logic associated with WCVM 146 is assumed to be stored on CRSM 142 (FIG. 2) and execute on one or more processors (not shown) of CPU 132 (FIG. 2) of smartphone 102 (FIGS. 1&2). It should be understood that the claimed subject matter can be implemented in many types of computing systems and data storage structures but, for the sake of simplicity, is described only with respect to smartphone 102 (FIG. 1). Further, the representation of WCVM 146 in FIG. 5 is a logical model. In other words, components 252, 254, 256 and 258 may be stored in the same or separate files and loaded and/or executed within components of smartphone 102, either as a single system or as separate processes interacting via any available inter process communication (IPC) techniques. In addition, functionality of WCVM 146 may be provided by a single server computing device (not shown) that provides the disclosed subject matter concurrently to multiple devices located in multiple locations.

I/O module 252 handles any communication WCVM 146 has with other components of smartphone 102. Data module 254 is a data repository for stored code and personnel data for implementing the claimed subject matter. Examples of the types of information stored in data module 254 include a code repository 262, device data 264, connection data 266, historical data 268 and operating parameters 270. In this example, code repository 262 stores actual computing code, or logic, for implementing the claimed subject matter. Device data 264 stores information relating to the device on which WCVM 146 is implemented, which in this example is smartphone 102. Such information may include, but is not limited to, communication hardware and protocols on smartphone 102.

Connection data 266 stores information relating to potential devices with which smartphone might connect. For example, connection data 266 may include data on identifiers, hardware and protocols associated with wireless devices 111-114 (FIG. 1) and 201-207 (FIG. 3). Historical data 268 stores information related to previously established connections between smartphone 102 and wireless device such as wireless devices 111-114 and 201-207. Historical data 268 enable WCVM 146 to facilitate connections with wireless devices with which smartphone 102 has previously connected, for example by enabling a user to simply request that specific connections be preapproved and configured. Operating parameters 270 includes information on various user and administrative preferences that have been set. For example, a user may set parameters to determine whether or not any particular detected wireless connection should be automatically connected or denied a connection.

Operating logic 256 stores the logic that implements WCVM 146. GUI 258 provides an interface that enables a user to setup, configure and connect with detected wireless devices. One example of such an interface is the display on screen 104 illustrated in FIG. 4. In addition, GUI 258 provides an interface for users and administrators to view and edit elements of data module 254, including device data 264, connection data 266, historical data 268 and operating parameters 270.

Figure 6:
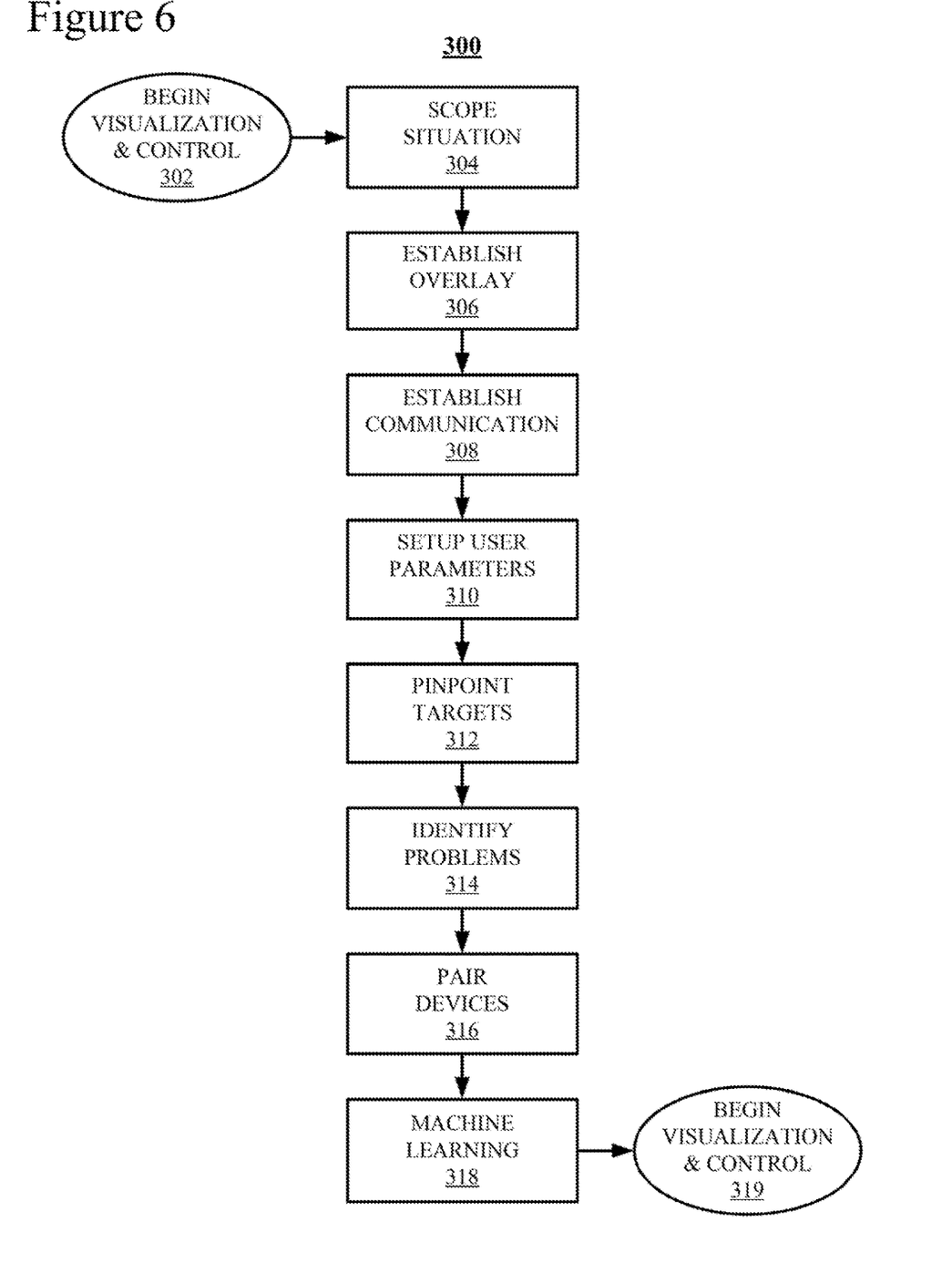
FIG. 6 is a flowchart illustrating one example of a Visualization and Control process that may implement the claimed subject matter.

FIG. 6 is a flowchart illustrating one example of a "Visualization and Control" process 300 that may implement the claimed subject matter. In this example, logic associated with process 300 is stored as WCVM 146 (FIGS. 2 & 5) on CRSM 142 (FIG. 2) and executed on processor 132 (FIG. 2), all on smartphone 102 (FIGS. 1&2).

Process 300 starts in a "Begin Visualization and Control" block 302 and proceeds immediately to a "Scope Situation" block 304. During processing associated with block 304, the current situation, or environment, is established, or "scoped." Scoping a situation involves determining the current landscape so that the landscape may be rendered into a visual format. For example, if the current landscape is a restaurant, the current landscape would consist of tables, chairs and the clientele. Scoping may be accomplished with existing object recognition services, to discover devices such as but not limited to TVs, tablets, beacons and Internet of Things (IoT) devices.

During processing associated with block an "Establish Overlay" block 306, a screen, when implemented on a smartphone or tablet, or a display, when implemented in an augmented reality device, is generated. Some items scoped during processing associated with block 304 may be rendered. In this example, icons, or icons 211-217 (FIG. 3), represent devices 201-207 (FIG. 3), which, in this example, represent the devices detected during processing associated with block 304, are generated and displayed by the user's device, such as smartphone 102 or VR goggles 106 (FIG. 1) (see 104, FIGS. 1 and 3).

During processing associated with an "Establish Communication" block 308, communication is established by the user's device 102 with the devices 201-207 scoped during processing associated with block 304. Both senders and receivers are identified. During processing associated with a "Setup User Parameters" block 310, Information on devices 201-207 may be retrieved from data stored on a centralized database (not shown) associated with a the particular venue. In addition, retrieved data may be stored on smartphone 102 as part of device data 264, connection data 266, historical data 268 and operating parameters 270 of data module 254, all described in conjunction with FIG. 5. Retrieved data is employed to establish connectivity between smartphone 102 and devices 201-207. Such data may include, but is not limited to, connectivity protocols pertaining the specific communication technology and the relative direction and orientation of each device 201-207. Correlation of the protocols, direction and orientation is performed in tandem with existing transmission model.

During processing associated with a "Pinpoint Targets" block 312, the display generated during processing associated with block 306 is augmented to represent the information retrieved during processing associated with block 310 and 312 (see 221-227, FIG. 4). During processing associated with an "Identify Problems" block 314, information related to issues associated with any device 201-207 or the corresponding connection with smartphone 102 may be represented by icons 221-227. For example, icon 225 is shaded with cross-boxed pattern to indicate that monitor 205 is not eligible to be paired with smartphone 102, perhaps because, but not limited to, monitor 205 is offline, smartphone 102 is incapable establishing a particular type of connection or monitor 205 has already reached a limit on the number of connections that it may support.

During processing associated with a "Pair Devices" block 316, connectivity with selected devices of FIG. 3 and generation of the augmented display of FIG. 4 are completed. At this point, the user is able to, for example, hear audio from selected devices with ear buds (not shown) or IoT hearing-based device. During processing associated with a "Machine Learning" block 318, information on the current devices, connections, setups and usage is stored in historical data 268 (FIG. 5) to aid in future data visualization scenarios of device connectivity within the particular venue. Finally, control proceeds to an "End Visualization and Control" block 319 in which process 300 is complete.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for controlling wireless devices, comprising:
   scoping a current physical environment to determine a plurality of existing objects within the current environment;
   detecting a plurality of wireless communication devices present among the plurality of existing objects;
   establishing a plurality of connections, each connection with a respective wireless communication device of the plurality of wireless communication devices;
   generating a visual rendering, including representations corresponding to each of the wireless communication devices, of the current environment based upon the scoping and information received during the establishing of the plurality of connections, each representation indicating a status of the corresponding wireless communication device; and
   controlling one or more of the wireless communication devices based upon the corresponding status.

2. The method of claim 1, wherein the rendering is implemented on a smartphone.

3. The method of claim 1, wherein the rendering is implemented in conjunction with virtual reality (VR) goggles.

4. The method of claim 1, wherein the controlling comprises optimizing one or more wireless connection, each wireless connection corresponding to a respective device of the one or more wireless communication devices.

5. The method of claim 1, wherein the controlling comprises manipulating one or more audio streams, each stream corresponding to a respective device of the one or more wireless communication devices.

6. The method of claim 1, further comprising:
   storing information on the current environment, wireless communication devices, the statuses of the wireless communication devices and the controlling in a non-transitory, computer-readable storage medium;
   retrieving the stored information at a subsequent implementation of the method; and
   automatically controlling, during the subsequent implementation, the one or more wireless communication devices based upon the stored information.

7. The method of claim 1, wherein the wireless communication devices are one of a list, the list consisting of:
   WiFi devices;
   Near Field Communication (NFC) devices; and
   Bluetooth® devices.

* * * * *